US012755558B2

(12) United States Patent
Schulter et al.

(10) Patent No.: US 12,755,558 B2
(45) **Date of Patent: *Oct. 6, 2026**

(54) OPEN-VOCABULARY OBJECT DETECTION WITH VISION AND LANGUAGE SUPERVISION

(71) Applicant: NEC Laboratories America, Inc., Princeton, NJ (US)

(72) Inventors: Samuel Schulter, Long Island City, NY (US); Vijay Kumar Baikampady Gopalkrishna, Santa Clara, CA (US); Yumin Suh, Santa Clara, CA (US); Shiyu Zhao, Piscataway, NJ (US)

(73) Assignee: NEC Corporation, Tokyo (JP)

( * ) Notice: Subject to any disclaimer, the term of this patent is extended or adjusted under 35 U.S.C. 154(b) by 368 days.

This patent is subject to a terminal disclaimer.

(21) Appl. No.: 18/448,345

(22) Filed: Aug. 11, 2023

(65) Prior Publication Data

US 2024/0078816 A1 Mar. 7, 2024

Related U.S. Application Data

(60) Provisional application No. 63/460,077, filed on Apr. 18, 2023, provisional application No. 63/400,422, filed on Aug. 24, 2022.

(51) Int. Cl.

| | |
|---|---|
| ***G06V 20/58*** | (2022.01) |
| ***G06F 40/30*** | (2020.01) |
| ***G06F 40/40*** | (2020.01) |
| ***G06V 10/82*** | (2022.01) |

(52) U.S. Cl.
CPC ............ *G06V 20/584* (2022.01); *G06F 40/30* (2020.01); *G06F 40/40* (2020.01); *G06V 10/82* (2022.01); *G06V 2201/07* (2022.01)

(58) Field of Classification Search
None
See application file for complete search history.

(56) References Cited

U.S. PATENT DOCUMENTS

| | | | | |
|---|---|---|---|---|
| 10,755,099 | B2 * | 8/2020 | Lin | G06V 10/454 |
| 2023/0222821 | A1 * | 7/2023 | Delp, III | G06F 18/22 382/110 |
| 2023/0306747 | A1 * | 9/2023 | Mohr | G06V 40/103 |

OTHER PUBLICATIONS

Rohrbach et al., "Translating Video Content to Natural Language Descriptions," 2013 IEEE International Conference on Computer Vision, Sydney, NSW, Australia, 2013, pp. 433-440, doi: 10.1109/ICCV.2013.61. (Year: 2013).*

(Continued)

*Primary Examiner* — Michelle M Koeth
(74) *Attorney, Agent, or Firm* — Vincent Duffy

(57) ABSTRACT

A computer-implemented method for training a neural network to predict object categories without manual annotation is provided. The method includes feeding training datasets including at least images and data annotations to an object detection neural network, converting, by a text prompter, the data annotations into natural text inputs, converting, by a text embedder, the natural text inputs into embeddings, minimizing objective functions during training to adjust parameters of the object detection neural network, and predicting, by the object detection neural network, objects within images and videos.

20 Claims, 8 Drawing Sheets

(56) References Cited

OTHER PUBLICATIONS

D. Ko et al., "Video-Text Representation Learning via Differentiable Weak Temporal Alignment," 2022 IEEE/CVF Conference on Computer Vision and Pattern Recognition (CVPR), New Orleans, LA, USA, Jun. 24, 2022, pp. 5006-5015, doi: 10.1109/CVPR52688.2022.00496. (Year: 2022).*

Li, L. H., Zhang, P., Zhang, H., Yang, J., Li, C., Zhong, Y., . . . & Gao, J. (Jun. 17, 2022). Grounded language-image pre-training. In Proceedings of the IEEE/CVF Conference on Computer Vision and Pattern Recognition (pp. 10965-10975). (Year: 2022).*

Saito et al., "Strong-Weak Distribution Alignment for Adaptive Object Detection," 2019 IEEE/CVF Conference on Computer Vision and Pattern Recognition (CVPR), Long Beach, CA, USA, 2019, pp. 6949-6958, doi: 10.1109/CVPR.2019.00712 (Year: 2019).*

Liu et al., "Open-world Semantic Segmentation via Contrasting and Clustering Vision-Language Embedding," arXiv:2207.08455v2 [cs.CV], Jul. 19, 2022, https://doi.org/10.48550/arXiv.2207.08455 (Year: 2022).*

Radford, A., Kim, J. W., Hallacy, C., Ramesh, A., Goh, G., Agarwal, S., . . . & Sutskever, I. (Feb. 26, 2021). Learning transferable visual models from natural language supervision. In International conference on machine learning (pp. 8748-8763). PMLR.

Gu, X., Lin, T. Y., Kuo, W., & Cui, Y. (May 12, 2022). Open-vocabulary object detection via vision and language knowledge distillation. arXiv preprint arXiv:2104.13921.

Li, L. H., Zhang, P., Zhang, H., Yang, J., Li, C., Zhong, Y., . . . & Gao, J. (Jun. 17, 2022). Grounded language-image pre-training. In Proceedings of the IEEE/CVF Conference on Computer Vision and Pattern Recognition (pp. 10965-10975).

Ghiasi, G., Gu, X., Cui, Y., & Lin, T. Y. (2022, Jul. 20). Scaling open-vocabulary image segmentation with image-level labels. In European Conference on Computer Vision (pp. 540-557). Cham: Springer Nature Switzerland.

* cited by examiner

OPEN-VOCABULARY OBJECT DETECTION WITH VISION AND LANGUAGE SUPERVISION

RELATED APPLICATION INFORMATION

This application claims priority to Provisional Application No. 63/400,422 filed on Aug. 24, 2022, and Provisional Application No. 63/460,077 filed on Apr. 18, 2023, the contents of both of which are incorporated herein by reference in their entirety.

BACKGROUND

Technical Field

The present invention relates to object detection in images and videos, and, more particularly, to open-vocabulary object detection with vision and language supervision.

Description of the Related Art

Detecting (localizing and classifying) objects in images and videos is an important task for a plethora of applications, from surveillance to image editing to robotics. There exist tens of thousands of different object categories that users need to recognize that serve different types of applications. Efficient ways to train neural networks are needed to predict this large number of object categories without manually annotating everything, a practically infeasible effort.

SUMMARY

A method for training a neural network to predict object categories without manual annotation is presented. The method includes feeding training datasets including at least images and data annotations to an object detection neural network, converting, by a text prompter, the data annotations into natural text inputs, converting, by a text embedder, the natural text inputs into embeddings, minimizing objective functions during training to adjust parameters of the object detection neural network, and predicting, by the object detection neural network, objects within images and videos.

A non-transitory computer-readable storage medium comprising a computer-readable program for training a neural network to predict object categories without manual annotation is presented. The computer-readable program when executed on a computer causes the computer to perform the steps of feeding training datasets including at least images and data annotations to an object detection neural network, converting, by a text prompter, the data annotations into natural text inputs, converting, by a text embedder, the natural text inputs into embeddings, minimizing objective functions during training to adjust parameters of the object detection neural network, and predicting, by the object detection neural network, objects within images and videos.

A system for training a neural network to predict object categories without manual annotation is presented. The system includes a processor and a memory that stores a computer program, which, when executed by the processor, causes the processor to feed training datasets including at least images and data annotations to an object detection neural network, convert, by a text prompter, the data annotations into natural text inputs, convert, by a text embedder, the natural text inputs into embeddings, minimize objective functions during training to adjust parameters of the object detection neural network, and predict, by the object detection neural network, objects within images and videos.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The exemplary embodiments of the present invention provide for a novel training algorithm for a neural-network-based object detector. The algorithm can learn from different forms of annotations, that is, object detection annotations (providing location and semantics for a few hundred object categories), pairs of images and corresponding captions (no location given, but natural text describing the image), and potentially other types of annotations (like object attributes or actions). For image-caption pairs, the algorithm includes a specific loss function that automatically aligns objects with words of the sentence (no localization annotation is provided in such instance). Prior works in this domain assume association between object instances and words in a sentence to be given. However, the exemplary training algorithm also includes text-prompting strategies to train from detection annotations (and attributes and action datasets).

Figure 1:
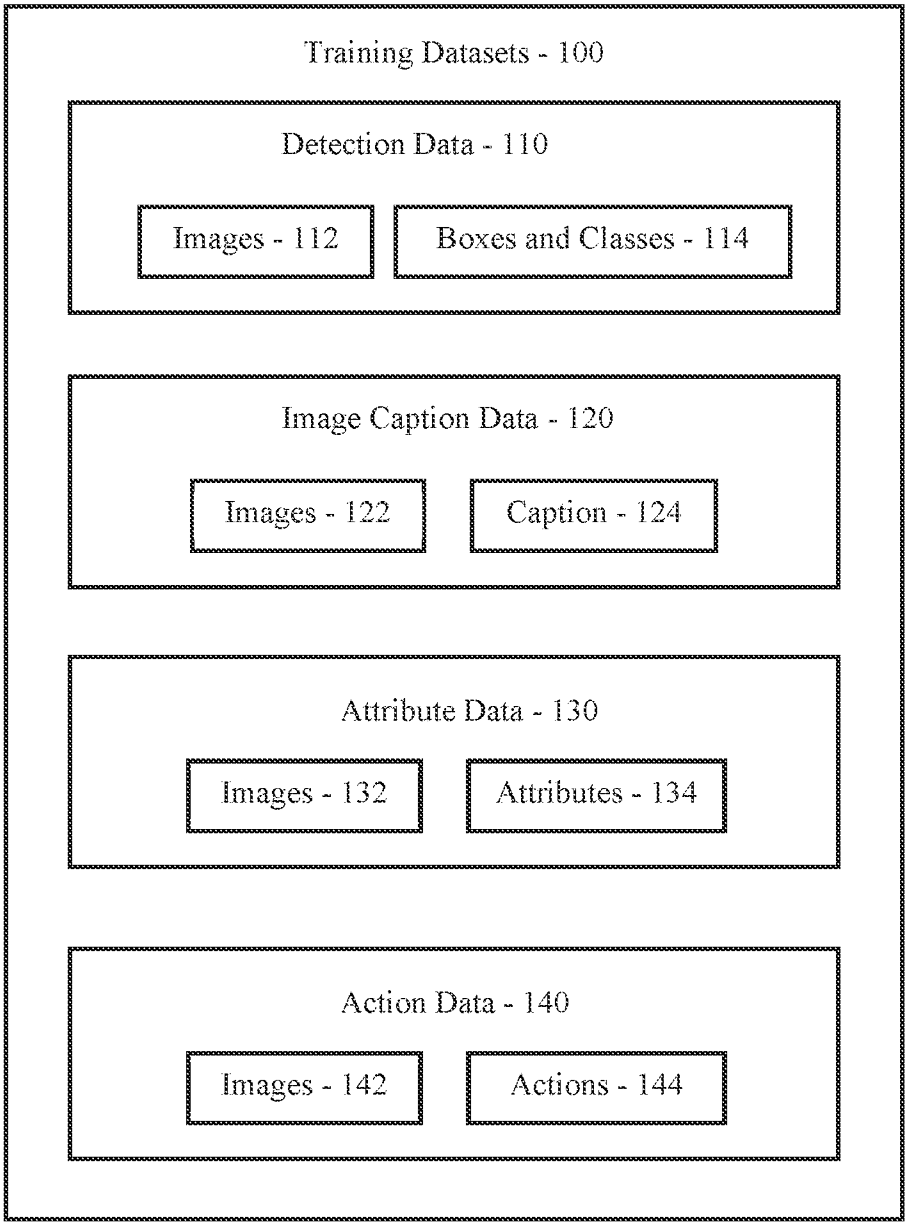
FIG. 1 is a block/flow diagram of exemplary training databases, in accordance with embodiments of the present invention.

FIG. 1 is a block/flow diagram of exemplary training databases, in accordance with embodiments of the present invention.

Regarding the training datasets 100, data is provided to train the neural network 210 (FIG. 2), where each type of dataset includes at least images and annotations.

With respect to detection data 110, object detection data includes images 112 along with annotations for all object instances of a certain set of object categories 114. For example, the COCO dataset annotates all instances of 80 categories. Objects-365 does so for 365 categories. The annotation is in the form of bounding boxes in the 2D image space (4 coordinates) along with the category for each object in the images.

With respect to image caption data 120, this type of dataset includes pairs of images 122 and a natural text sentence describing the image content 124.

With respect to attribute data 130, object attribute datasets include images 132 along with a set of attributes 134 for objects that are contained in the image. For example, an image capturing a human, the attributes may describe the hair, the gender, the clothing, etc.

With respect to action data 140, action data includes images 142, usually frames extracted from videos, along with annotation for actions 144 that occur in the image. For example, the annotation could be "person riding bicycle."

Figure 2:
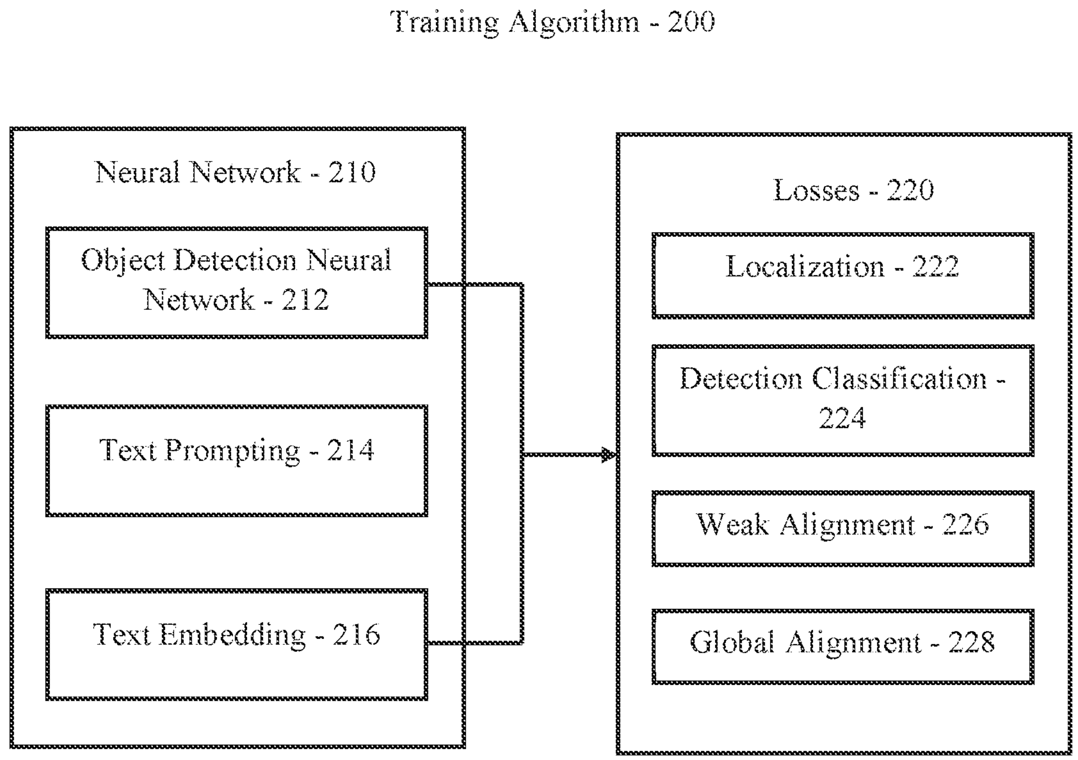
FIG. 2 is a block/flow diagram of an exemplary training algorithm, in accordance with embodiments of the present invention.

FIG. 2 is a block/flow diagram of an exemplary training algorithm, in accordance with embodiments of the present invention.

Regarding the training algorithm 200, the neural network 210 summarizes all learnable parameters of the neural network that the training algorithm 200 adjusts, along with other parameters or components that are part of data pre-processing.

With respect to the object detection neural network 212, the neural network takes an image as input and predicts a set of object instances. Each object instance is described with a bounding box and some semantic description. Traditional detectors predict a probability distribution over a fixed label space. However, the open-vocabulary detectors of the exemplary embodiments predict a semantic embedding that fits a joint vision-and-language embedding space to compare the embedding with natural text inputs.

With respect to text prompting 214, this is a pre-processing step for the training process, where the data annotations are converted into natural text inputs (by the text prompter). For example, detection data 110 can be converted into a simple sentence concatenating all object categories. Another option is to use a template sentence for each instance, such as "A photo of a <CLS>", where "<CLS>" is replaced with the category annotation. For image-caption pairs, no prompting is needed. For other datasets, some sentence is generated that contains the annotations provided by the corresponding dataset.

With respect to text embedding 216, this is a neural network (parameters may be frozen or updated during training) that converts natural text into embeddings, one vector for each word.

Regarding losses 220, these are the objective functions that are minimized during the training process 200 to adjust the parameters of the neural network 210.

With respect to localization 222, the objective is to minimize the localization ability of the object detector 212. This objective is only applied for datasets with appropriate annotations, e.g., the object detection data 110.

With respect to detection classification 224, when category annotations are available for each instance, the exemplary methods apply a standard classification loss. This can be done for the object detection data 110 and often for the attribute data 130.

With respect to weak alignment 226, this is an objective function designed for data where no alignment between the input text and the image is given in the form of bounding boxes. For instance, image-caption pairs only provide the image and a caption. Weak alignment 226 finds a soft assignment (via similarities) between all detections and words in the input text. Based on these similarities, a single value can be computed that judges the assignment between detections and words.

With respect to global alignment 228, like weak alignment 226, this objective function is designed for data where no alignment between input text and the image is given. Instead of computing a soft assignment between words and detections, this loss computes two feature embeddings whose similarity should be maximized. The two embeddings summarize the input image and the input text. This is similar to recent vision-and-language model pre-training, such as CLIP.

In conclusion, the exemplary methods propose a novel training algorithm for an object detection neural network to train from both object detection annotations and image-caption pairs. Weak alignment losses to train from image-caption pairs without localization annotation are further employed, with additional localization, detection classification, and global alignment.

Figure 3:
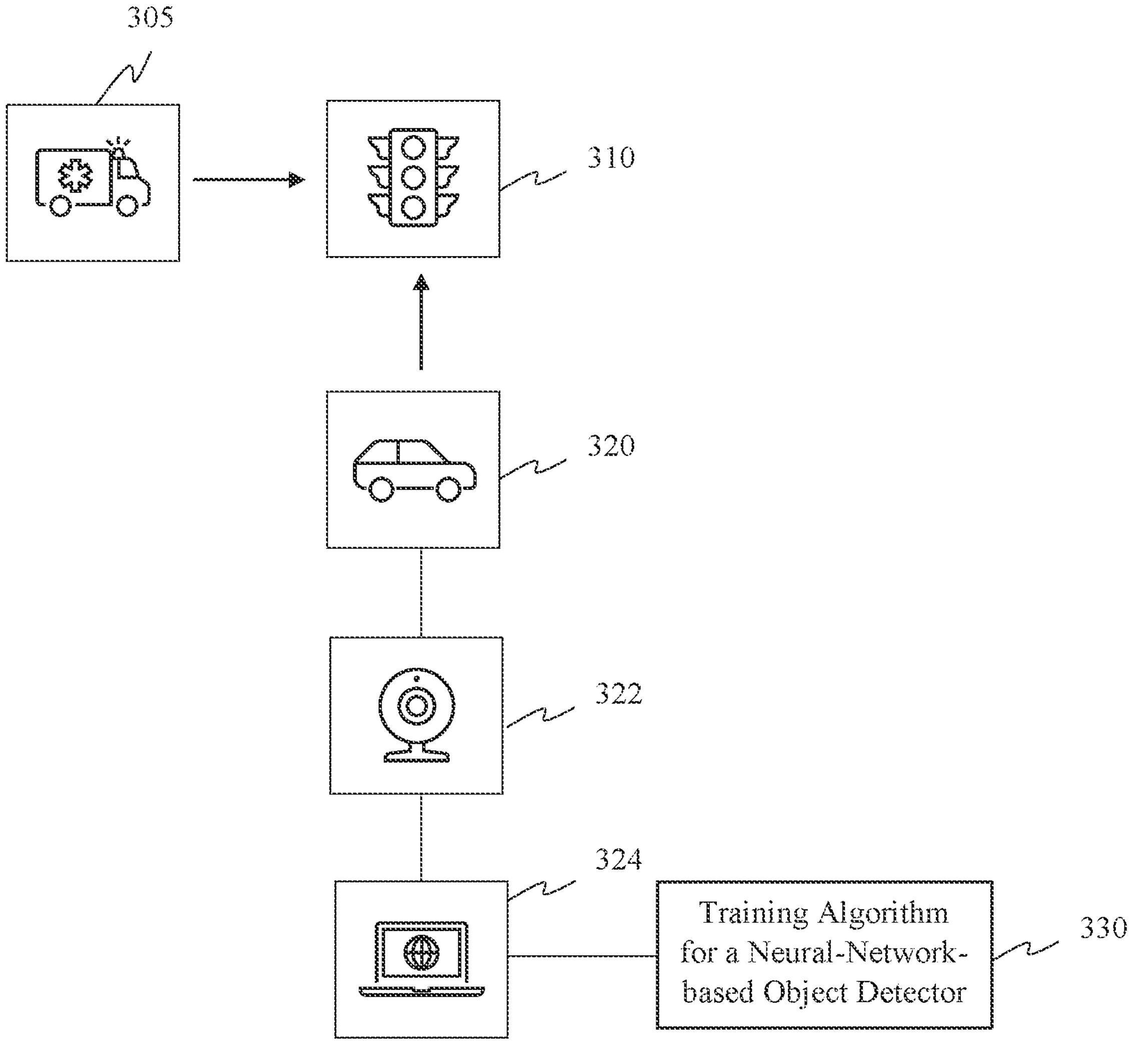
FIG. 3 is a block/flow diagram of an exemplary first practical application for detecting objects and images with an advanced driver assistance system (ADAS), in accordance with embodiments of the present invention.

FIG. 3 is a block/flow diagram of an exemplary first practical application for detecting objects and images with an advanced driver assistance system (ADAS), in accordance with embodiments of the present invention.

One implementation of the exemplary embodiments of the present invention is an advanced driver assistance system (ADAS) that leverages the rich semantic perception from open-vocabulary to make better safety decisions.

The open-vocabulary detector is fine-tuned via transfer learning and additional data specifically related to road scenes. As in the main inventive concept, different forms of annotations can be used, that is, bounding boxes, image classification, image captions, etc. The obtained open-vocabulary detector is placed into an on-board processing unit of a car that is attached to a camera, which captures the scene. A reasoning logic queries the open-vocabulary detector with free-form text descriptions of objects to better understand the scene.

Because of the larger label space of the open-vocabulary detector, the reasoning model can handle many more situations and aid the driver. For example, in FIG. 3, the open-vocabulary detector understands the difference between any regular van and an ambulance with emergency lights turned on. This significant difference can alert the driver to stop at an intersection even though the driver has a green light.

Prior solutions cannot provide such rich semantics to a reasoning module and hence limit the types of situations such that the ADAS system can handle and provide assistance on. For every new situation or category, additional data with bounding box annotations would need to be obtained.

Referring back to FIG. 3, a car 320 having one or more cameras 322 and an open-vocabulary detector 324 running a training algorithm 330 are presented. The one or more cameras 322 capture the scene having a traffic light 310 where an ambulance 305 is approaching. The open-vocabulary detector 324 understands that an ambulance 305 is approaching an intersection with the traffic light 310. The driver of the car 320 can be alerted to stop at the intersection even though the driver of the car 320 has a green light (to allow passage of the ambulance 305).

Figure 4:
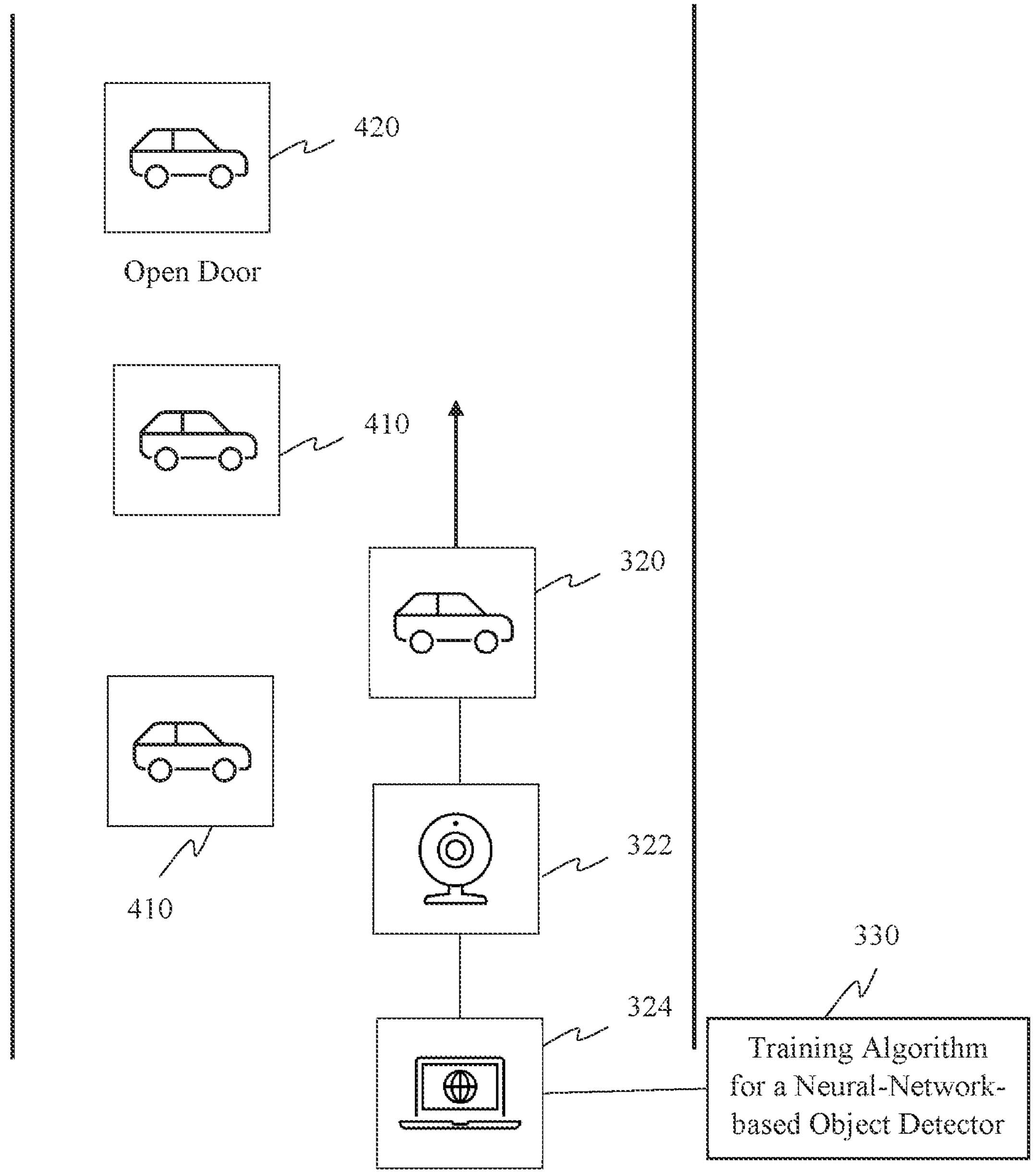
FIG. 4 is a block/flow diagram of an exemplary second practical application for detecting objects and images with an advanced driver assistance system (ADAS), in accordance with embodiments of the present invention.

FIG. 4 is a block/flow diagram of an exemplary second practical application for detecting objects and images with an advanced driver assistance system (ADAS), in accordance with embodiments of the present invention.

An autonomous car 320 drives on the road with parked cars 410 on the right. One of the parked cars 420 has a door that was just opened. The open-vocabulary detector 324 understands the difference between a category description "a car" and "car with open doors." Thus, the open-vocabulary detector 324 can provide this information to the planner. The planner can then be alerted of a person potentially exiting the parked car and decide to either slow down or keep a larger distance from the car.

Prior solutions rely on object detectors with a fixed label space that cannot differentiate between closed or open doors of parked cars. This makes it impossible for the planner to be alerted of the potential threat. Alternate solutions would need collection of training data for each such corner case, where an open door for a parked car is just a single example of many. As a result, the automotive industry can use this feature in autonomous vehicles as well as for advanced driver assistance systems.

Figure 5:
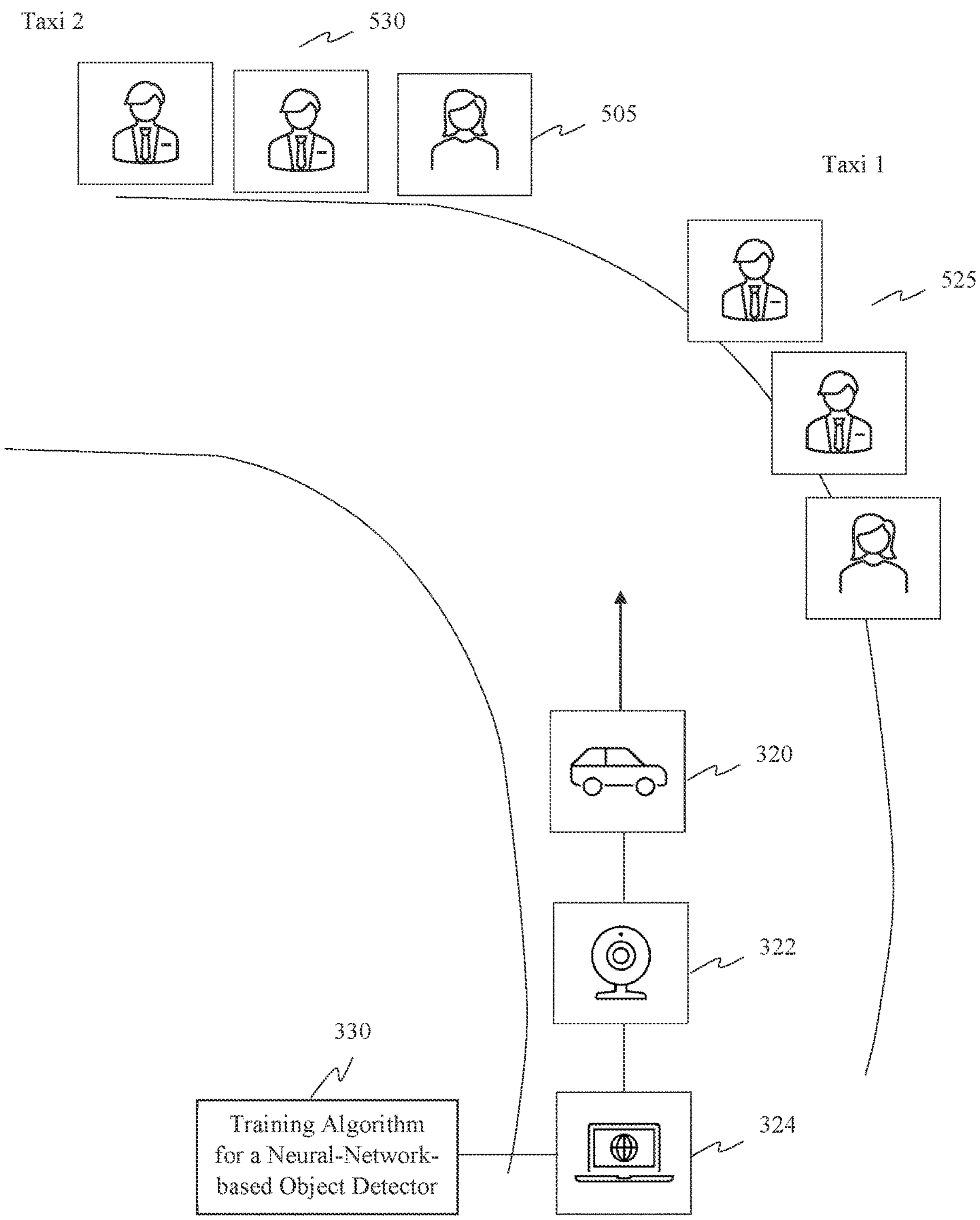
FIG. 5 is a block/flow diagram of an exemplary third practical application for detecting objects and images with an advanced driver assistance system (ADAS), in accordance with embodiments of the present invention.

FIG. 5 is a block/flow diagram of an exemplary third practical application for detecting objects and images with an advanced driver assistance system (ADAS), in accordance with embodiments of the present invention.

A robo-taxi approaches the airport to pick up the person who requested pick-up service. The person provided a description of herself about where she is and what she is wearing. For example, "I'm standing close to the sign with the number 2 on it and I'm wearing the blue jacket and sunglasses." The robo-taxi analyzes all pedestrians waiting for pickup with the open-vocabulary detector, which can understand the free-form text description. In the instant example, two instances are detected based on the description. The robo-taxi can request more information from the passenger who replies "wearing a Red Hat." With this information, the open-vocabulary detector 324 identifies a single person and the robo-taxi navigates to that person.

For example, the woman 505 at taxi-stand 2 is the person who requested the service. The robo-taxi can pick out this woman from taxi-stand 2 and from taxi-stand 1 because the robo-taxi can analyze all the people (525, 530) from both taxi stands with the aid of the open-vocabulary detector 324 in cooperation with the one or more cameras 322.

Prior solutions cannot handle free-form text descriptions of objects and need to parse the text to work with a human attribute detection system. Such systems are limited in the attributes and values that can be understood and extending such systems is a cumbersome annotation effort. The open-vocabulary detector 324 understands free-form text and provides a natural interaction system between the robo-taxi and the passenger 505 requesting the pick-up service.

Figure 6:
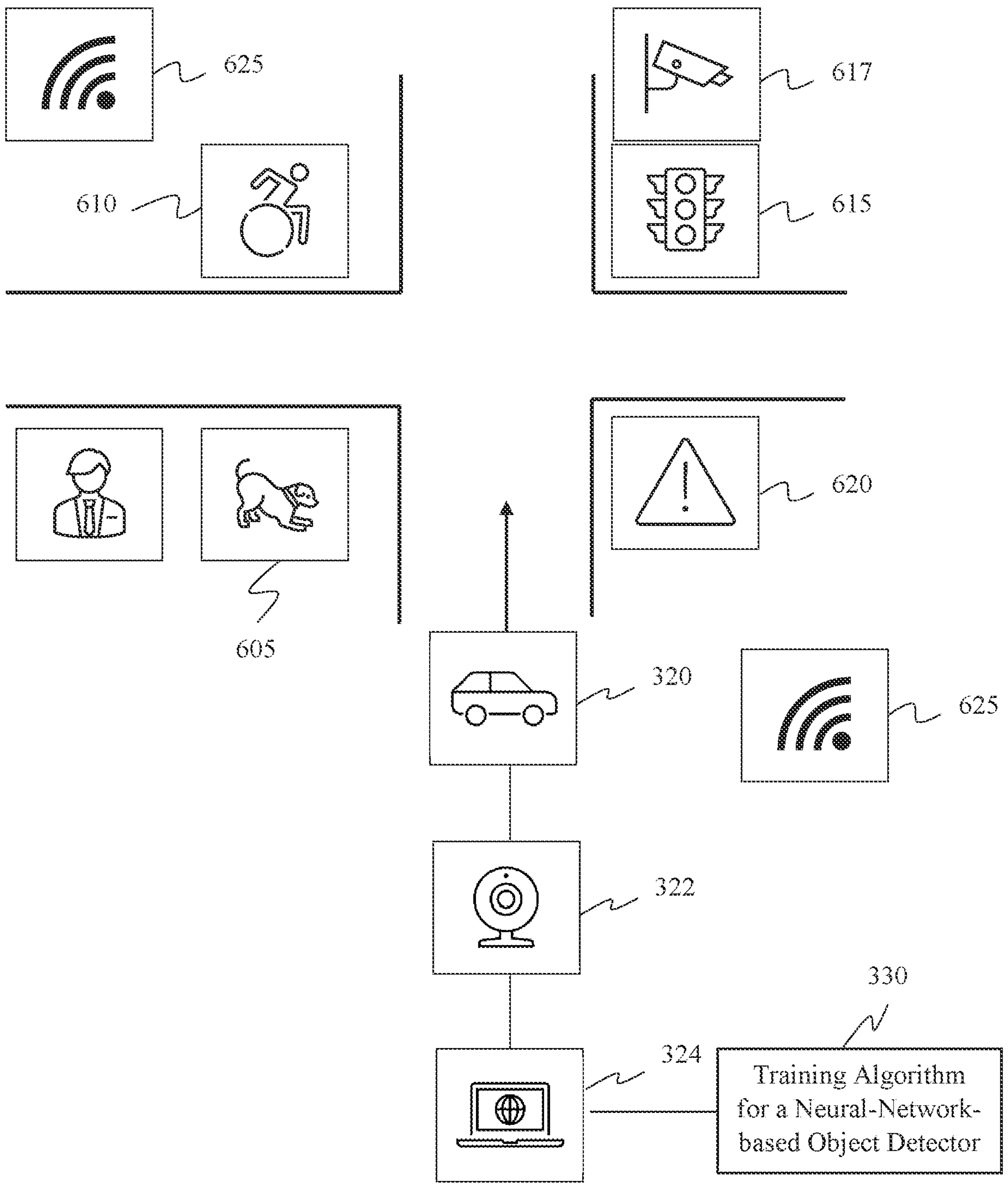
FIG. 6 is a block/flow diagram of an exemplary fourth practical application for detecting objects and images with an advanced driver assistance system (ADAS), in accordance with embodiments of the present invention.

FIG. 6 is a block/flow diagram of an exemplary fourth practical application for detecting objects and images with an advanced driver assistance system (ADAS), in accordance with embodiments of the present invention.

The rich semantics of the open-vocabulary detector 324 provides valuable insights into the current state of situations at traffic intersections. These insights are processed inside edge devices to provide alerts 620 to oncoming traffic via displays, to pedestrians via displays and speakers or even via alerts on phones or inside cars. Such traffic monitoring systems are improved by the open-vocabulary detector 324 such that the system can identify a much wider set of potentially dangerous situations.

The open-vocabulary detector 324 can understand the nuanced difference between a dog that is on a leash versus a dog 605 that just came off a leash (eventually by accident). There is a chance the dog 605 may run into the intersection and cause accidents. Similarly, the open-vocabulary detector 324 can provide the additional information about a person sitting in a wheelchair 610 to whom elevated attention should be attributed at the intersection with the traffic light 615.

Prior solutions rely on object detectors with a fixed set of known category names and, therefore, can only identify a significantly smaller set of potentially dangerous situations than what the open-vocabulary detector 324 enables. The open-vocabulary detector 324 can be deployed on edge devices for enhanced privacy.

Governments (at all levels, federal state, city) can use such solution for enhanced safety at traffic intersections. Other commercial use cases can be companies that operate airports or construction sites where (on ground) traffic is necessary, and the above-described traffic monitoring solution can enhance safety.

The open-vocabulary detector 324 can be provided as a service in the cloud and can be requested by a 5G network 625 of cameras mounted at traffic intersections 615 for monitoring purposes. Multiple cameras 617 can be installed to cover the whole intersection 615 including the surrounding pedestrian areas such as sidewalks. The open-vocabulary detector 324 can be provided as a service in the cloud for a quick deployment across multiple intersections at a very low cost.

Figure 7:
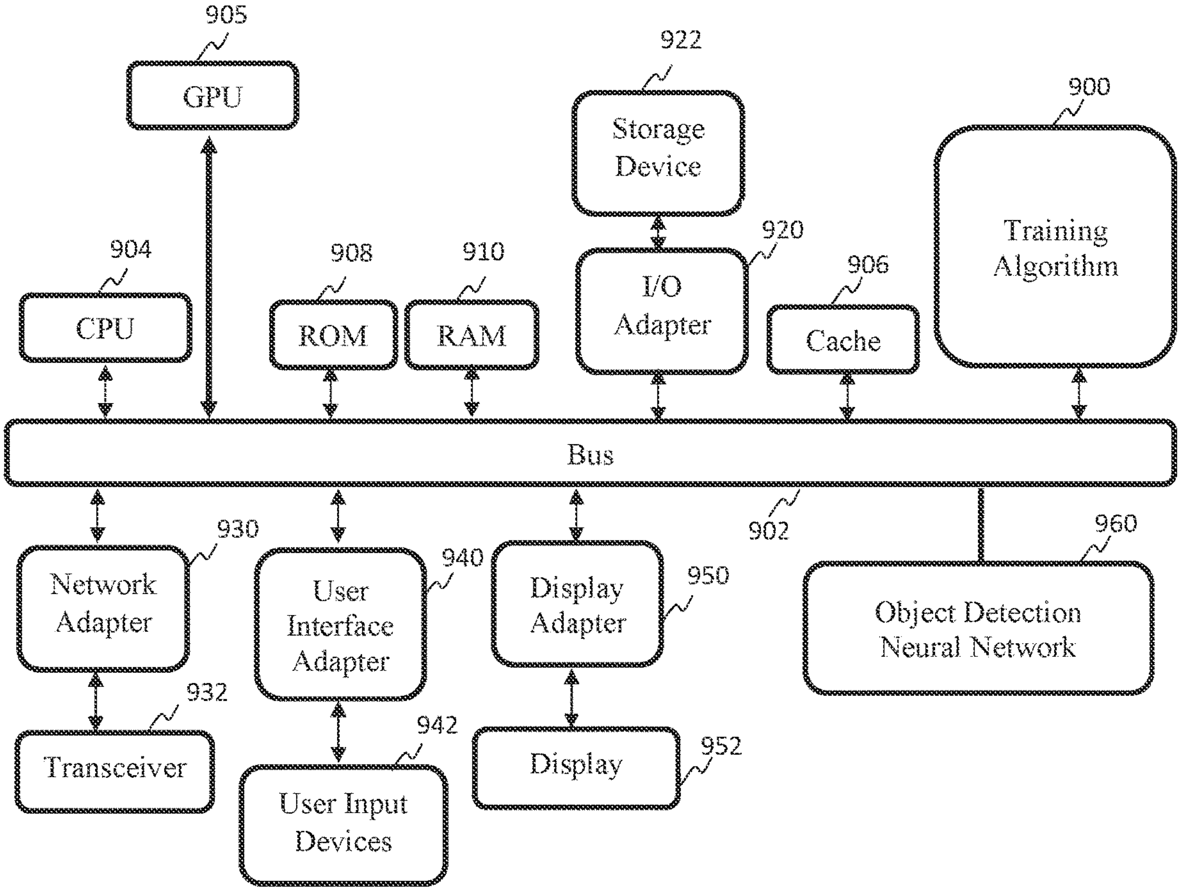
FIG. 7 is a block/flow diagram of an exemplary processing system for detecting objects and images employing the training algorithm, in accordance with embodiments of the present invention.

FIG. 7 is an exemplary processing system for detecting objects and images, in accordance with embodiments of the present invention.

The processing system includes at least one processor (CPU) 904 operatively coupled to other components via a system bus 902. A GPU 905, a cache 906, a Read Only Memory (ROM) 908, a Random Access Memory (RAM) 910, an input/output (I/O) adapter 920, a network adapter 930, a user interface adapter 940, and a display adapter 950, are operatively coupled to the system bus 902. Additionally, a training algorithm 900 is employed to train an object detection neural network 960.

A storage device 922 is operatively coupled to system bus 902 by the I/O adapter 920. The storage device 922 can be any of a disk storage device (e.g., a magnetic or optical disk storage device), a solid-state magnetic device, and so forth.

A transceiver 932 is operatively coupled to system bus 902 by network adapter 930.

User input devices 942 are operatively coupled to system bus 902 by user interface adapter 940. The user input devices 942 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 942 can be the same type of user input device or different types of user input devices. The user input devices 942 are used to input and output information to and from the processing system.

A display device 952 is operatively coupled to system bus 902 by display adapter 950.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 8:
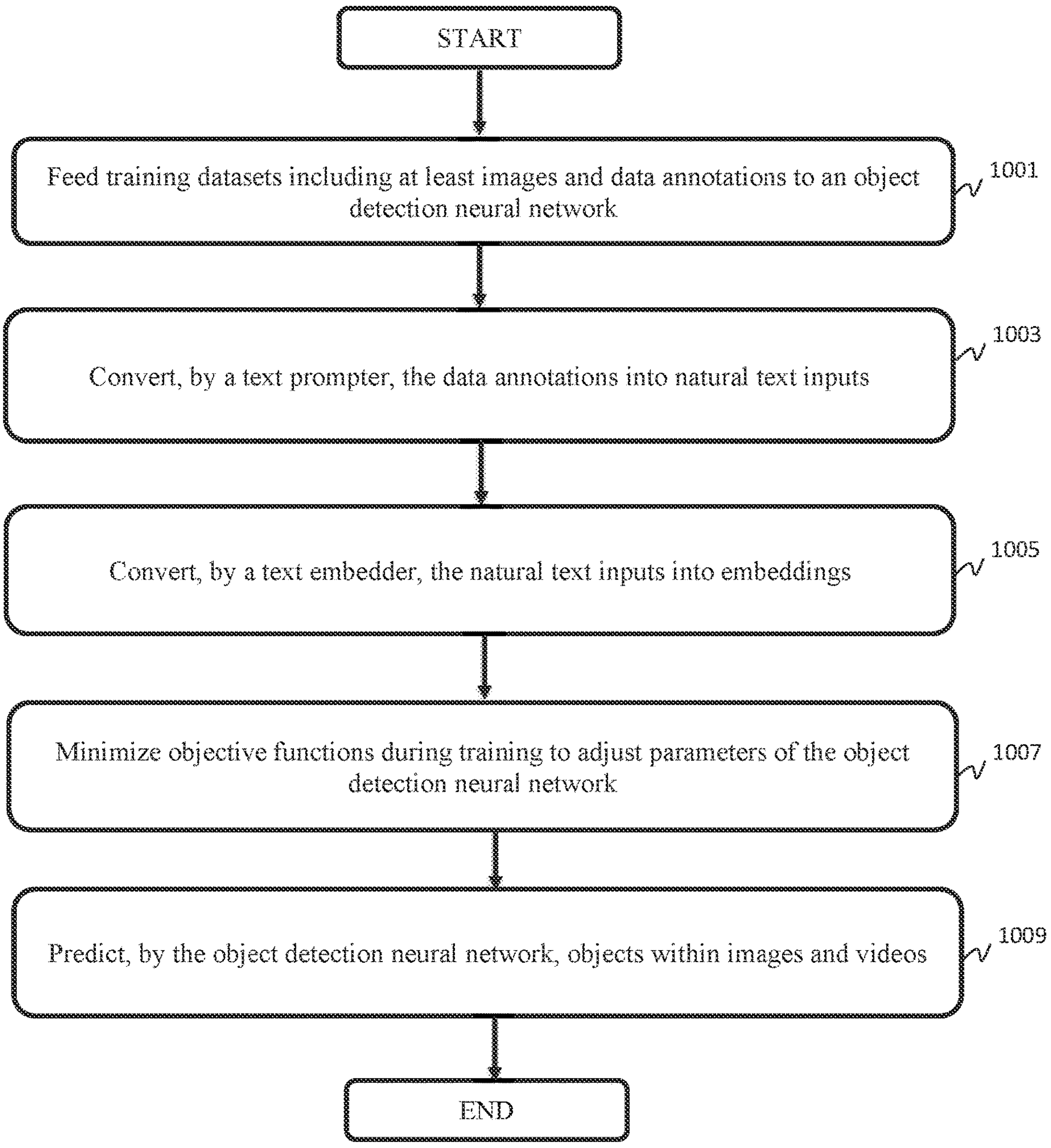
FIG. 8 is a block/flow diagram of an exemplary method for detecting objects and images employing the training algorithm, in accordance with embodiments of the present invention.

FIG. 8 is a block/flow diagram of an exemplary method for detecting objects and images, in accordance with embodiments of the present invention.

At block 1001, feed training datasets including at least images and data annotations to an object detection neural network.

At block 1003, convert, by a text prompter, the data annotations into natural text inputs.

At block 1005, convert, by a text embedder, the natural text inputs into embeddings.

At block 1007, minimize objective functions during training to adjust parameters of the object detection neural network.

At block 1009, predict, by the object detection neural network, objects within images and videos.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like. Similarly, where a computing device is described herein to send data to another computing device, the data can be sent directly to the another computing device or can be sent indirectly via one or more intermediary computing devices, such as, for example, one or more servers, relays, routers, network access points, base stations, and/or the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "calculator," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for training a neural network to predict object categories without manual annotation, the method comprising:
- feeding training datasets including at least images and data annotations to an object detection neural network;
- converting, by a text prompter, the data annotations into natural text inputs;
- converting, by a text embedder, the natural text inputs into embeddings;
- minimizing objective functions, including a localization loss, a detection classification loss, a weak alignment loss that determines a soft assignment between all detections from the images and words in the data annotations, and a global alignment loss that determines feature embeddings that maximize similarity between the images and the data annotations, that utilize the embeddings based on a determined alignment for summarizing the images and the data annotations during training to adjust parameters of the object detection neural network; and
- generating control instructions for an autonomous vehicle to avoid a collision by predicting, by the object detection neural network, objects within images and videos of a traffic scene that includes the autonomous vehicle.

2. The computer-implemented method of claim 1, wherein the training datasets include at least detection data, image caption data, attribute data, and action data.

3. The computer-implemented method of claim 2, wherein the detection data is converted into a simple sentence concatenating all object categories.

4. The computer-implemented method of claim 1, wherein each object is described with a bounding box and some semantic description.

5. The computer-implemented method of claim 1, wherein localization is applied to minimize localization ability of the object detection neural network.

6. The computer-implemented method of claim 1, wherein a classification loss is applied when category annotations are available for each object.

7. The computer-implemented method of claim 1, wherein a weak alignment objective function and a global alignment objective function are applied, the weak alignment objective function trained from image-caption pairs without localization annotation.

8. A computer program product for training a neural network to predict object categories without manual annotation, the computer program product comprising a non-transitory computer readable storage medium having program instructions embodied therewith, the program instructions executable by a computer to cause the computer to perform a method comprising:
- feeding training datasets including at least images and data annotations to an object detection neural network;
- converting, by a text prompter, the data annotations into natural text inputs;
- converting, by a text embedder, the natural text inputs into embeddings;
- minimizing objective functions, including a localization loss, a detection classification loss, a weak alignment loss that determines a soft assignment between all detections from the images and words in the data annotations, and a global alignment loss that determines feature embeddings that maximize similarity between the images and the data annotations, that utilize the embeddings based on a determined alignment for summarizing the images and the data annotations during training to adjust parameters of the object detection neural network; and
- generating control instructions for an autonomous vehicle to avoid a collision by predicting, by the object detection neural network, objects within images and videos of a traffic scene that includes the autonomous vehicle.

9. The computer program product of claim 8, wherein the training datasets include at least detection data, image caption data, attribute data, and action data.

10. The computer program product of claim 9, wherein the detection data is converted into a simple sentence concatenating all object categories.

11. The computer program product of claim 8, wherein each object is described with a bounding box and some semantic description.

12. The computer program product of claim 8, wherein localization is applied to minimize localization ability of the object detection neural network.

13. The computer program product of claim 8, wherein a classification loss is applied when category annotations are available for each object.

14. The computer program product of claim 8, wherein a weak alignment objective function and a global alignment objective function are applied, the weak alignment objective function trained from image-caption pairs without localization annotation.

15. A computer processing system for training a neural network to predict object categories without manual annotation, comprising:

a memory device for storing program code; and a processor device, operatively coupled to the memory device, for running the program code to:

feed training datasets including at least images and data annotations to an object detection neural network;

convert, by a text prompter, the data annotations into natural text inputs;

convert, by a text embedder, the natural text inputs into embeddings;

minimize objective functions, including a localization loss, a detection classification loss, a weak alignment loss that determines a soft assignment between all detections from the images and words in the data annotations, and a global alignment loss that determines feature embeddings that maximize similarity between the images and the data annotations, that utilize the embeddings based on a determined alignment for summarizing the images and the data annotations during training to adjust parameters of the object detection neural network; and generate control instructions for an autonomous vehicle to avoid a collision by predicting, with the object detection neural network, objects within images and videos of a traffic scene that includes the autonomous vehicle.

16. The computer processing system of claim 15, wherein the training datasets include at least detection data, image caption data, attribute data, and action data.

17. The computer processing system of claim 15, wherein each object is described with a bounding box and some semantic description.

18. The computer processing system of claim 15, wherein localization is applied to minimize localization ability of the object detection neural network.

19. The computer processing system of claim 15, wherein a classification loss is applied when category annotations are available for each object.

20. The computer processing system of claim 15, wherein a weak alignment objective function and a global alignment objective function are applied, the weak alignment objective function trained from image caption pairs without localization annotation.

* * * * *